United States Patent [19]
Muller

[11] 3,895,664
[45] July 22, 1975

[54] VEHICLE ANTI-SKID DEVICE
[76] Inventor: Fritz Muller, Gruneggstr. 38b, 6000 Lucerne, Switzerland
[22] Filed: Jan. 28, 1974
[21] Appl. No.: 437,497

[30] Foreign Application Priority Data
Feb. 23, 1973 Switzerland.................... 2624/73

[52] U.S. Cl. ................. 152/225; 152/219; 152/241
[51] Int. Cl. ............................................. B60c 27/02
[58] Field of Search ........................... 152/225-233, 152/217-219, 239, 241

[56] References Cited
UNITED STATES PATENTS
2,806,503  9/1957  Hamerski........................... 152/225
2,886,091  5/1959  Hines................................ 152/228
3,249,143  5/1966  Scott................................. 152/225

FOREIGN PATENTS OR APPLICATIONS
1,918,001  10/1969  Germany........................... 152/225

*Primary Examiner*—Drayton E. Hoffman
*Attorney, Agent, or Firm*—Werner W. Kleeman

[57] ABSTRACT

An anti-skid device for vehicles which comprises a support which can be attached to a part of the vehicle, typically the wheel, the hub or to the wheel axle, and at which support there are attached both respective ends of each of a number of anti-skid elements, in the form of spring brackets or straps which extend in substantially star-like configuration from the supports and are flexed over the tire tread. The spring-bracket arms are interconnected laterally of the wheel. Each spring bracket is hingedly connected with the support and there is provided as the lateral interconnection of the spring bracket arms a tensioning chain which is lengthwise adjustable by at least one tensioning lock means or tightener device such that for the momentary condition the spring brackets or straps, arranged between the wheel and the support, can be pressed on the one hand against the wheel at the peripheral region by tensioning the tensioning chain and on the other hand against the support.

10 Claims, 12 Drawing Figures

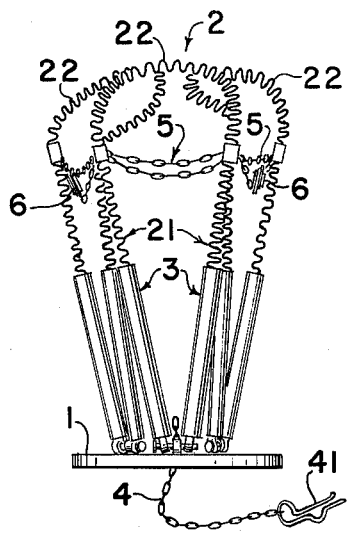
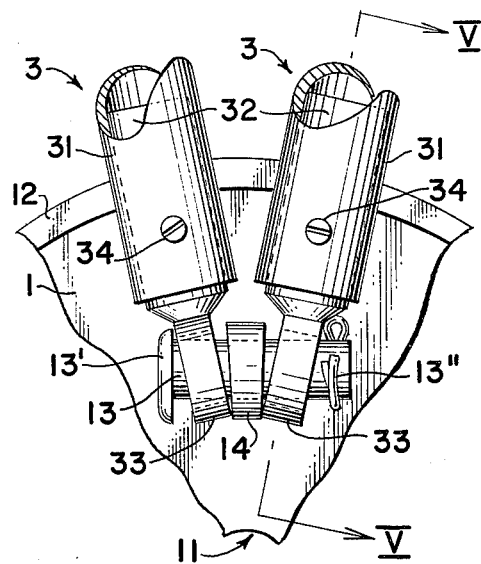
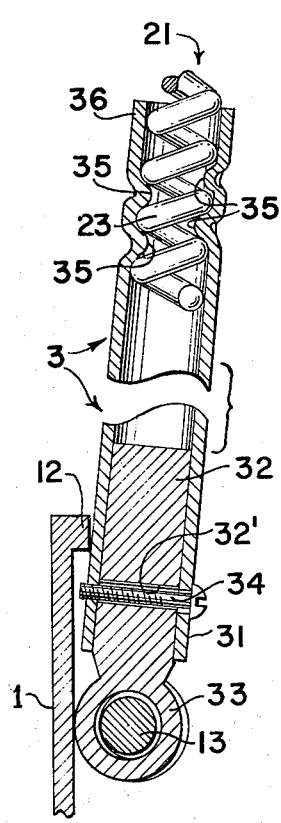
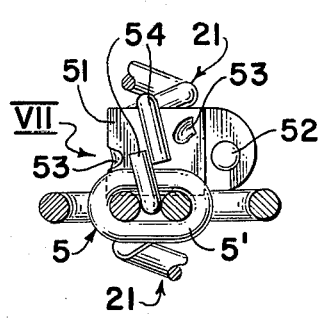
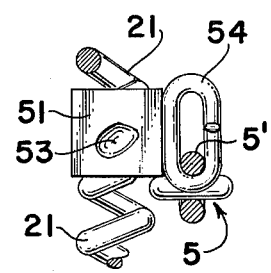
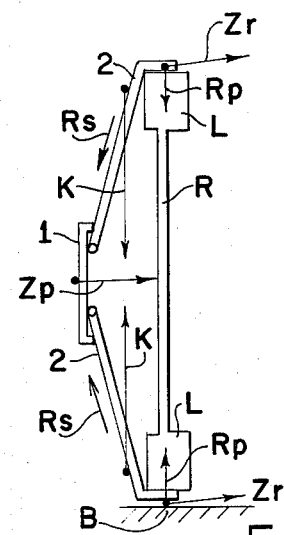

VEHICLE ANTI-SKID DEVICE

BACKGROUND OF THE INVENTION

The present invention relates to a new and improved construction of anti-skid device for the wheels of vehicles of the type comprising a support or support body which can be attached to a part of the vehicle, typically the wheel, the hub or the wheel axle, and at which support there are attached both respective ends of each of a number of anti-skid elements, in the form of spring brackets or straps which extend in substantially star-like configuration from the support and are flexed over the tread of the tire, wherein the spring bracket arms are interconnected with one another laterally of the wheel.

Vehicle anti-skid devices possessing spring straps or brackets protruding in a star-like configuration from a support or support body required for quite some time an exact central guiding at the vehicle. This necessitated the mounting of pot-shaped anchoring bodies at the vehicle and claws at the support which cooperated with such anchoring bodies. Such anchoring arrangement must take up the entire lateral force which acts upon the spring straps or brackets, however it also must insure that the support remains centered. Now under certain conditions it has happened that the spring straps or brackets nonetheless became detached laterally or in the peripheral direction from the tire tread or were undesirably lifted, reducing or annihilating the effectiveness of the anti-skid device. Also damage to the vehicle could be ascertained. This only could be countered for quite some time by connection of the spring straps or brackets at the tire tread. However, owing to this measure, the versatility of the device was partially lost. It was also very difficult to mount. Finally, the connections and spring straps at the tread tended to mutually destroy one another, resulting in the device becoming unusable and damage to the vehicle. Moreover, all heretofore known variants of such device, when not in use, are also quite bulky and require a great deal of space, for instance during transport in the trunk of the vehicle.

SUMMARY OF THE INVENTION

Hence it is a primary object of the present invention to provide an improved construction of vehicle anti-skid device which is not associated with the aforementioned drawbacks and limitations of the prior art constructions.

Another and more specific object of the present invention aims at the provision of a new and improved construction of vehicle anti-skid device of the previously mentioned type which both during operation, i.e., when mounted at the wheels of the vehicle, as well as also when not in use, i.e., during storage and transport, is not associated with the drawbacks of the prior art constructions.

A further object of the invention aims at a new and improved anti-skid device for vehicles which can be easily mounted, possesses reliable operating characteristics, renders possible a space-saving transport, and furthermore, possesses considerable versatile adaptability to different wheel sizes.

Now in order to implement these and still further objects of the invention, which will become more readily apparent as the description proceeds, the apparatus of the previously mentioned type is manifested by the features that each spring strap or bracket is hingedly connected with the support or support body, and there is provided as the lateral interconnection of the spring strap arms a tensioning chain which is lengthwise adjustable by at least one tensioning lock or chain tightener device such that in the mounted state of the anti-skid device the spring straps arranged between the wheel and the support, due to tensioning of the tension chain, can be pressed on the one hand at the tread region against the wheel and on the other hand against the support.

The spring straps or brackets are preferably fabricated from helical springs. This means that with the tension chain relaxed, the spring straps, owing to their pivotal mounting at the support, can be pivoted or rocked such that they can be easily pushed over the tread of the wheel and removed therefrom. Due to tensioning of the tensioning chain, the periphery or circumference of the device can be reduced. Now during such reduction in the circumference or periphery, the spring brackets or straps are pressed against the tread of the tire and the spring strap or bracket arms carry out a radial movement. In so doing, they naturally stem or prop themselves by means of their ends situated closer to the center of the wheel against their mounting at the support. The support tends to deviate from such pressure by means of an axial movement, whereby it places under tension its anchoring at the vehicle (especially at a bracket which is fixedly held by the wheel nut members). The support therefore cannot detach from the wheel. Consequently, there is realized the result that the spring straps or brackets are pressed both against the wheel (at the tread region) as well as also against the support, with the result that the device is fixedly clamped at the wheel.

Due to rotation of the wheel when in motion, it rolls upon the ground. Hence, in the case of a pneumatic tire, it is flattened at the ground, so that via the spring straps there is produced a thrust at the support which displaces such upwards. Since the spring strap can be clamped quite firmly between the wheel and the path of travel of the vehicle, the spring arms, in contrast to what was previously thought to be necessary, should experience as small as possible thrust load. It is therefore preferred that the spring arms are mounted with play at the support and that the support is not rigidly, rather movably anchored at the vehicle. Such anchoring can occur by means of a chain, which for instance can be suspended at a bracket held by the wheel nut members. This chain is preferably guided out of a central hole of the disk-shaped support and secured at the outside of such disk, especially by means of a lock. Consequently, the length of the anchoring chain and therefore the spacing of the support from the wheel can be regulated, something which advantageously should occur prior to tensioning or tightening of the tensioning chain. In order to obtain for the mounted device the preferred truncated cone-like arrangement of the spring strap arms, it is advantageous if the aforementioned support disk possesses an edge which is raised and directed towards the spring strap arms. Then during mounting the anchoring chain it can be pulled out to such an extent from the aforementioned central hole of the disk until the spring arms tightly bear against the tire flanks and at the raised disk edge. Due to tensioning of the tensioning chain by means of the at least one tensioning lock or the like, it is possible to impart to the anti-skid device its fixed seating at the wheel.

The anti-skid device when demounted can be folded together into a relatively space-saving unit or package, especially by folding away the spring straps or brackets from the support, and which folded the anti-skid device then can be again brought into its work position without any problem whatsoever.

By virtue of the fact that the anti-skid device can be fixedly clamped in the described manner at the wheel and nonetheless there is maintained a certain radial mobility of the entire device (previously only the brackets were deformable), it has been surprisingly found that its characteristics during travel are improved, without there still being necessary the hindering connection at the side of the tread or running surfaces of the prior devices.

The foldability of the device renders it extremely suitable for storage and transport. The mobility which is brought about by virtue of the foldability of the device, however, also facilitates the mounting, that is, application of the device and the removal of such device from the wheels of the vehicle.

In order to obtain a particularly good transmission of the compression forces generated by the tensioning chain, especially thrust forces of the spring strap arms at the support, it is advantageous and preferred to hingedly mount support or carrier tubes at the support, and in which support tubes there are secured the ends of the spring straps or brackets. If these support tubes or pipes are preferably rotatable about their lengthwise axis and constructed to be arrestable or blockable, and if they possess an appropriate inner surface which threadably cooperates with the spring strap arms, for instance engages between the coils or windings of helical spring strap or bracket arms, then they can additionally serve as simple adjustment mechanisms for the periphery of the device. The further that a spring strap arm is threaded into the support pipe, by rotating the support pipe, or threaded out of such support pipe, then to that much greater extent is the diameter of the device reduced or enlarged, as the case may be. It thus can be accommodated to the wheel diameter. Furthermore, in this way each spring strap or bracket can be exchanged by appropriately rotating the support or carrier tubes.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 is a schematic view of the demounted and folded together vehicle anti-skid device as seen when looking in a viewing angle similar to the direction of the arrow II of FIG. 1;

FIG. 4 is an enlarged detail view, looking in the direction of the arrow IV of FIG. 2, of the connection between the support or carrier tubes and the support disk or disk-like support;

FIG. 5 is a cross-sectional view through the end region of a support tube, taken substantially along the line V—V of FIG. 4;

FIG. 6 is an enlarged detail view showing the connection between the tensioning chain and a spring strap or bracket at the location identified by reference character VI in FIG. 1;

FIG. 7 is a view showing the connection between the tension or tensioning chain and the spring strap looking in the direction of the arrow VII of FIG. 6;

FIG. 12 schematically portrays the force distribution.

DETAILED DESCRIPTION OF THE PREFERRED EMBODIMENTS

Figure 1:
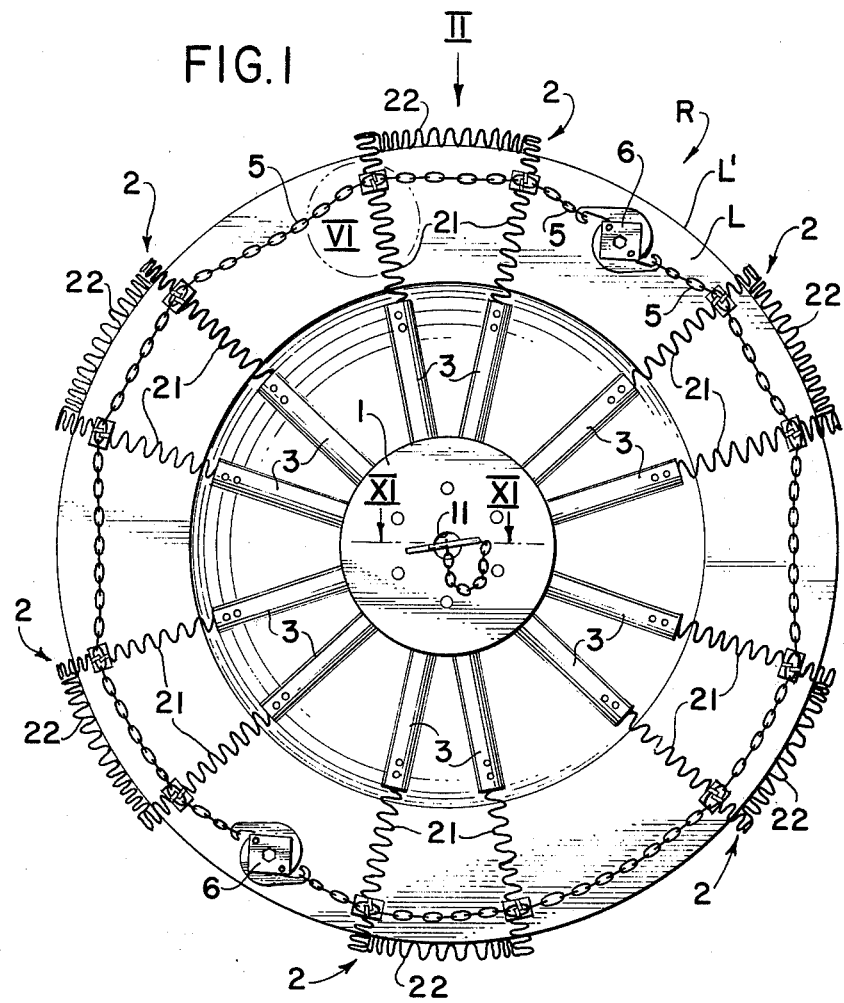
FIG. 1 is a schematic front view of a vehicle anti-skid device mounted at a wheel.

Describing now the drawings, it is to be understood that in the various Figures thereof the same reference characters have been generally employed throughout to designate the same or analogous components. Now by referring to FIGS. 1–3, there will be recognized a support in the form of a support disk or support body disk 1 of the vehicle anti-skid device at which, in a manner to be more fully described with regard to FIGS. 4 and 5, there are hingedly mounted the spring straps or brackets 2 via the support or carrier tubes 3. Each spring strap 2 possesses two spring arms or arm members 21 which extend essentially radially when in use, as best seen by referring to FIGS. 1 and 2, as well as an arcuate portion 22 which interconnects such arms 21. The spring strap ends 23, which have been best shown in FIG. 5, are attached to the support tubes or pipes 3 in a manner to be explained more fully hereinafter with reference to FIG. 5.

Figure 8:
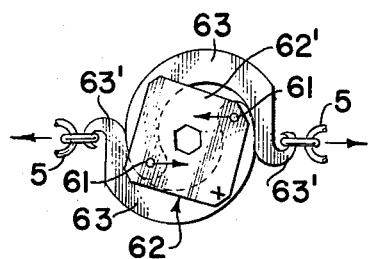
FIG. 8 is an enlarged detail, looking in the direction of the arrow VIII of FIG. 2, of a tensioning lock or chain tightener in its chain tensioning position.
Figure 9:
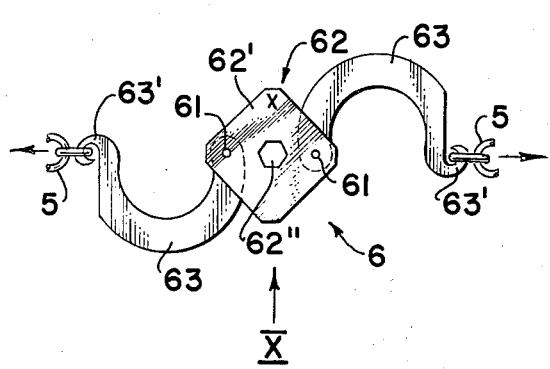
FIG. 9 illustrates the tensioning lock or tightener depicted in FIG. 8 in its relaxed or released position.

The substantially disk-like support body or support 1 has a central hole or bore 11 through which there extends outwardly therefrom an anchoring chain 4 or equivalent structure. By means of this anchoring chain 4 the support 1 is secured to the vehicle as will be developed more fully with regard to FIG. 11. The spring strap arms 21 are connected with one another laterally of the tire L of the wheel R by means of a tension or tensioning chain 5 secured thereto as will be explained in conjunction with FIGS. 6 and 7. Such tensioning chain 5 has been shown in FIGS. 1 and 2 in a tensioned state by means of both of the chain tensioning locks or tighteners 6 (cf. also the description of FIGS. 8 and 9 given hereinafter), whereas it has been shown in a relaxed or non-tensioned state in FIG. 2.

Figure 2:
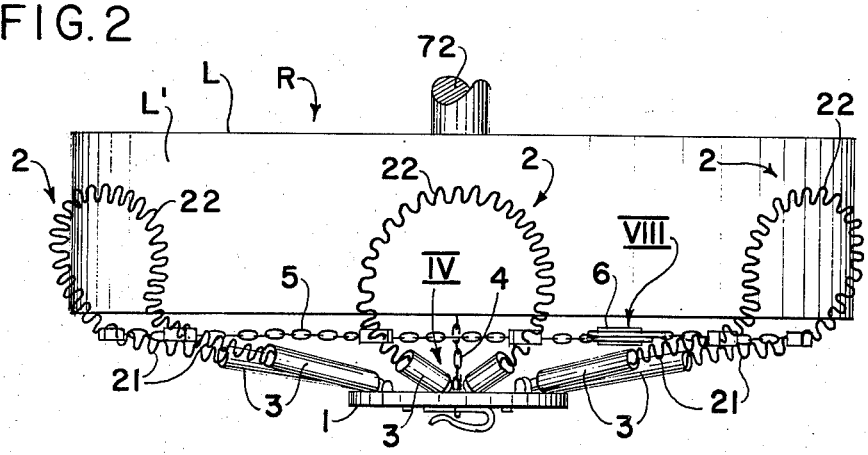
FIG. 2 is a top plan view looking in the direction of the arrow II of the vehicle anti-skid device depicted in FIG. 1.

As will be developed more fully hereinafter with respect to FIG. 12, the vehicle anti-skid device, in the mounted condition depicted in FIGS. 1 and 2, is tensioned or clamped on the wheel R, the spring strap arcuate or interconnecting portions 22 which are bent over the tread surface L' are pressed against such tread surface or tread, whereas the spring strap arms 21 are pressed via the support tubes 3 at or against the support body disk 1 which is anchored to the vehicle by means of the anchoring chain 4.

Now in FIG. 3 there has been shown the vehicle antiskid device in its collapsed or folded together state or condition, and it is readily possible to recognize the modest space requirements of the folded together device by comparing the same to the mounted condition thereof as shown in FIGS. 1 and 2.

The support or carrier tubes 3 are seated with their inner ends 31 upon a respective support bolt 32, each of which is equipped with a bearing eyelet 33 or the like. Each tube 3 is secured against rotation and axial displacement at its associated support bolt 32 by means of a screw 34 or the like in that such screw is threaded into threading of a throughpassing bore of the support tube 3 and simultaneously piercingly extends through a throughpassing bore 32' of the support bolt 32. If the screw 34 is removed, then, the associated support tube 3 can be rotated at the support bolt 32, with the result that there is carried out a threaded movement between the spring strap or bracket end 23 (FIG. 5) and the depressions or embossments 35 of the outer end 36 of the support tube 3, because the embossments or depressions engage between the threads or coils of the spring strap end 23, wherein such straps are shown constructed as helical springs. Thus, the depth of engagement of each spring strap end 23 and the associated support tube 3 can be regulated. There also can be carried out accommodation of the periphery of the device at a wheel R, or a spring strap tube can be completely exchanged. After completing regulation of the device, each screw 34 again can be inserted.

The support body disk 1 has a raised or protruding edge 12 (FIGS. 4 and 5) which is directed towards the spring strap arms 21 and at which, in this case, there bear the support tubes when the anti-skid device is in its extended or non-collapsed condition. Consequently there is brought about the result that they must extend at an inclination (cf. FIG. 2) towards the wheel R from their bearing pins or journals 13, which pins piercingly extend with play through the bearing eyelets 33 of the support bolts 32 and are seated at a bearing or support 14 which is riveted to or otherwise conveniently mounted at the support body disk 1, whereby there results a truncated cone-like configuration. Each bearing pin 13 is provided at its one end with a head 13', whereas it is secured in a throughpassage bore at its other end by means of a splint or cotter pin 13''. Thus, also in this case there is provided a complete exchangeability of the components or parts if such should be found to be necessary owing to greater differences in accommodation of the parts to one another, because of wear, or for other reasons.

In order that the tensioning chain 5 possesses a particularly good action, it is non-displaceably, but intentionally adjustably, connected with each individual spring arm 21 (FIGS. 6 and 7). For this purpose a clamp or bracket 51 is pressure riveted, for instance by rivet 52, or otherwise connected in convenient fashion, at each spring arm close to the thread however at the region of the tire flanks or side walls. In order to insure that the clamp 51 cannot shift, it has embossments or depressions 53. Welded to the clamp 51 is an eyelet 54 which is fabricated of spring steel similar to a key ring, so that the element 5' of the tensioning chain 5 which is suspended thereat again can be removed therefrom and a different element again connected or suspended. This renders possible an exchange of the tension or tensioning chain 5 or an individual lengthwise adjustment of the tensioning chain length which is desired between individual spring strap arms 21.

Figure 10:
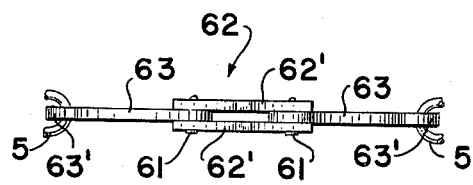
FIG. 10 is a view of the tensioning lock or tightener looking in the direction of the arrow X of FIG. 9.

In order to be able to tension the tensioning chain 5, there are provided for the exemplary embodiment under discussion the tensioning locks or chain tighteners 6 illustrated in FIGS. 8–10. Instead of using such tensioning locks, it would be of course equally possible to use other types of constructed or designed tensioning locks, as such are also conventionally employed at snow chains, if they permit obtaining a relatively high tension. There also can be employed more than two tensioning locks or equivalent structure. The tensioning locks 6 consist of four parts which are punched from the flat steel, and which are interconnected by both of the rivets 61 or other suitable connection means. The tensioning lock housing or frame 62 consists of two quadratic or square plates 62' which possess appropriately configured hexagonal holes or bores 62'' for the engagement of a correspondingly configured key or operating member having an internal hexagonal configuration. Between the plates 62' there are movably riveted the tensioning arms 63. In FIG. 8 the tensioning lock 6 has been portrayed in its chain tensioning position and in FIGS. 9 and 10 in its relaxed or opened position. Tensioning chain 5 is mounted at the hooks 63' of the tensioning arms 63. Tensioning occurs by rotating a tensioning lock housing 62 out of the position shown in FIG. 9, in counterclockwise direction, into the position depicted in FIG. 8. The reference character x which has been shown in a corner of the plate 62' represents a rotation through an angle greater than 180°, by means of which the rivets 61 arrive to one side of the connection line (as shown in phantom lines) of the hooks 63', so that the prevailing tension holds each lock closed. The relaxation or opening of the locks can occur in the clockwise direction. Each tensioning lock can generate large tensioning forces, which can be easily obtained through the use of a suitable internal hexagonal key or the like.

Figure 11:
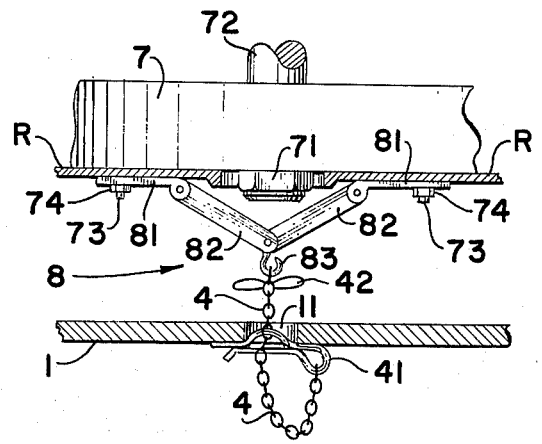
FIG. 11 is an enlarged cross-sectional view, taken substantially along the line XI—XI of FIG. 1, depicting the connection of the support plate and the vehicle.

In FIG. 11 there has been depicted the anchoring of the support body disk or support 1 at the vehicle. In the embodiment under consideration, there is secured at the wheel attachment disk 7 (a part of the hub) which is secured by nut 71 to the axle 72, upon the threaded bolt 73 not only the wheel R by means of the nuts 74, but also an anchoring bracket 8. This anchoring bracket 8 has two holding portions 81 which engage over the threaded bolts 73 and beneath the nuts 74, and which holding portions are hingedly connected by not particularly illustrated rivets or the like with both of the arms 82. These arms 82 are hingedly riveted or otherwise interconnected with one another and with a hook 83. In this way it is possible by pivoting the components 81 and 82 towards one another to regulate the spacing of the holes (not shown) at the holding portions 81, so that the anchoring bracket can be universally employed. However, other constructions can come under consideration, for instance, rigid structures. The anchoring bracket or other anchoring means also can be mounted at the axle, for instance beneath the nut 71; it also could be mounted at the wheel R. At the hook 83 there is suspended the anchor or anchoring chain 4 which is guided through the hole or bore 11 of the support body disk 1 and at that location is secured by a hairpin-like lock 41. In order to insure that the chain 4 cannot become lost when the anti-skid device is dismantled, it has a clamp handle or tongue at the inside, whereas its outer end remains permanently suspended at the lock 41.

Now in FIG. 12 there is schematically depicted what forces retain the device at the wheel R, wherein only the support body disk or support 1 and schematically the spring straps or brackets 2 have been known by way of convenience in illustration. At the spring straps 2 there engage radially effective forces K, which bring about that the spring straps 2 will be pressed against the tire in the direction of the arrows $Rp$ and in the direction of the arrows $Rs$ will experience a thrust in the direction of the support body disk 1. Now because however the support body disk 1 is retained by the reaction force $Zp$ at the anchoring chain against the wheel, there is produced as a further reaction also the axial force components $Zr$ directed towards the wheel R. There is also shown that the tension generated by the tensioning chain produces a force component which is effective at the tire L, and which retains the anti-skid device axially and radially at the wheel and thus at the tread of the tire L. Thus, owing to the movable anchoring of the support body disk or support by the anchoring chain, there can occur a slight displacement and eccentricity of the anti-skid device with regard to the wheel, which is completely desired because it renders possible a better contact between the wheel R, the spring straps 2 and the ground.

Instead of the helical spring straps or brackets, it would also be possible to use other spring straps or brackets, for instance formed of round- or flat steel. Furthermore, the spring straps also can be directly hingedly mounted at the support or support body without the use of the support tubes.

While there is shown and described present preferred embodiments of the invention, it is to be distinctly understood that the invention is not limited thereto but may be otherwise variously embodied and practiced within the scope of the following claims.

Accordingly, what is claimed is:

1. An anti-skid device for the wheels of vehicles, comprising a support which can be attached to a part of the vehicle defined by either the wheel, the hub or the axle of the vehicle, a plurality of spring straps, each of said straps having a pair of spring arms and a pair of ends attached with said support, said plurality of spring straps extending outwardly from said support to provide a substantially star-like configuration of said straps at said support, each of said straps having a portion which is flexed only over the tread of the tire, means for pivotably connecting each pair of the spring arms with the support, said pivotably connecting means comprising a respective pivot shaft for each spring strap, each pivot shaft extending transversely with respect to the axis of the wheel, a lengthwise adjustable tensioning chain serving as a lateral connection of the spring arms, at least one tensioning lock means for the lengthwise adjustment of the tensioning chain, wherein in the mounted condition of the anti-skid device the spring straps arranged between the wheel and the support are pressed against the wheel and against the support by tensioning the tensioning chain.

2. The vehicle anti-skid device as defined in claim 1, further including support tubes, said pivotably connecting means including means for pivotably supporting the support tubes at the support, each spring strap end being secured in an associated pivotably mounted support tube.

3. The anti-skid device as defined in claim 2, wherein each of said pivotably mounted support tubes comprise holding means pivotably connected at the support in order to permit each of said support tubes to be rotatable about its lengthwise axis and arrestable on its holding means, each of said spring straps comprise helical springs, and each support tube possesses substantially thread-like portions at its inner surface which engage between helical spring coils of the associated spring strap arm.

4. The anti-skid device as defined in claim 3, wherein each spring strap is pivotably mounted with play at the support.

5. The anti-skid device as defined in claim 1, wherein the tensioning chain is suspended at means stationarily mounted at each spring arm.

6. The anti-skid device as defined in claim 5, wherein such suspension means comprise hook means.

7. The anti-skid device as defined in claim 5, wherein such suspension means comprise eyelet means.

8. The anti-skid device as defined in claim 1, wherein the support is constituted by a disk having a hole at its central region and equipped with a raised edge directed towards the spring arms, said disk being anchored by means of an anchoring chain which extends through its central hole and secured at its outside by lock means.

9. The anti-skid device as defined in claim 8, wherein the anchoring chain is selectively suspended at least at any one of the wheel, hub or axle of the vehicle.

10. An anti-skid device for the wheels of vehicles, comprising a support which can be attached to a part of the vehicle defined by either the wheel, the hub or the axle of the vehicle, a plurality of spring straps, each of said straps having spring arms and a pair of ends attached with said support and arranged to provide a substantially star-like configuration of said straps at said support, said straps protruding from said support and having a portion which is flexed over the tread of the tire, means for interconnecting the spring arms laterally of the wheel, means for hingedly mounting the spring straps at the support, said connecting means for the spring arms comprising a lengthwise adjustable tensioning chain serving as a lateral connection of the spring arms, at least one tensioning lock means for the lengthwise adjustment of the tensioning chain, wherein in the mounted condition of the anti-skid device the spring straps arranged between the wheel and the support are pressed in the peripheral direction against the wheel and against the support by tensioning the tensioning chain, support tubes, said hingedly mounting means including means for hingedly supporting the support tubes at the support, each spring strap end being secured in an associated hingedly mounted support tube, said hingedly supporting means comprise holding means hingedly connected at the support in order to be rotatable about its lengthwise axis and arrestable, each support tube being mounted at said holding means, and each support tube possesses substantially thread-like portions at its inner surface which engage with the spring strap arms, the spring straps comprise helical springs, and wherein the thread-like portions engage between helical spring coils of the spring strap arm.

* * * * *